(12) United States Patent
Pucci

(10) Patent No.: US 7,284,974 B2
(45) Date of Patent: Oct. 23, 2007

(54) APPARATUS FOR COMPRESSION MOLDING ARTICLES MADE OF PLASTICS

(75) Inventor: Fabrizio Pucci, Castel Guelfo (IT)

(73) Assignee: Sacmi Cooperativa Meccanici Imola S.C.R.L., Imola (IT)

( * ) Notice: Subject to any disclaimer, the term of this patent is extended or adjusted under 35 U.S.C. 154(b) by 148 days.

(21) Appl. No.: 10/414,311

(22) Filed: Apr. 16, 2003

(65) Prior Publication Data

US 2003/0198708 A1   Oct. 23, 2003

(30) Foreign Application Priority Data

Apr. 23, 2002 (IT) ................... BO2002A0225

(51) Int. Cl.
*B29C 31/06* (2006.01)

(52) U.S. Cl. ........... 425/126.1; 425/261; 425/345; 425/438; 425/809

(58) Field of Classification Search ........... 425/126.1, 425/261, 809, 344–345, 349, 422, 438, 453
See application file for complete search history.

(56) References Cited

U.S. PATENT DOCUMENTS

| 3,135,019 | A |  | 6/1964 | Aichele |
| 3,767,892 | A |  | 10/1973 | Armstrong et al. |
| 4,304,744 | A | * | 12/1981 | Stroud .................. 425/809 |
| 4,336,011 | A | * | 6/1982 | George et al. ............. 425/809 |
| 4,412,797 | A | * | 11/1983 | Murayama ............... 425/127 |
| 4,979,282 | A |  | 12/1990 | Alieri et al. |
| 5,332,381 | A | * | 7/1994 | Shapcott ................. 425/127 |
| 5,401,154 | A | * | 3/1995 | Sargent .................. 425/114 |
| 5,807,592 | A | * | 9/1998 | Alieri ................... 425/347 |
| 5,811,044 | A |  | 9/1998 | Rote et al. |
| 6,007,315 | A | * | 12/1999 | Busacchi ................ 425/126.1 |

FOREIGN PATENT DOCUMENTS

| EP | 1 293 332 | 3/2003 |
| GB | 1 604 560 | 12/1981 |
| WO | 03 047831 | 6/2003 |

* cited by examiner

*Primary Examiner*—James P. Mackey
*Assistant Examiner*—Thu Khanh T. Nguyen
(74) *Attorney, Agent, or Firm*—Nixon & Vanderhye P.C.

(57) ABSTRACT

An apparatus for compression molding of articles made of plastics, comprising: molding means; feeding means for feeding doses of plastic material, which are provided with removal elements for removing in succession said doses from an extruder and transferring the doses onto said molding means; and conditioning means for conditioning temperature of said doses during transfer thereof from said extruder to said molding means.

23 Claims, 5 Drawing Sheets

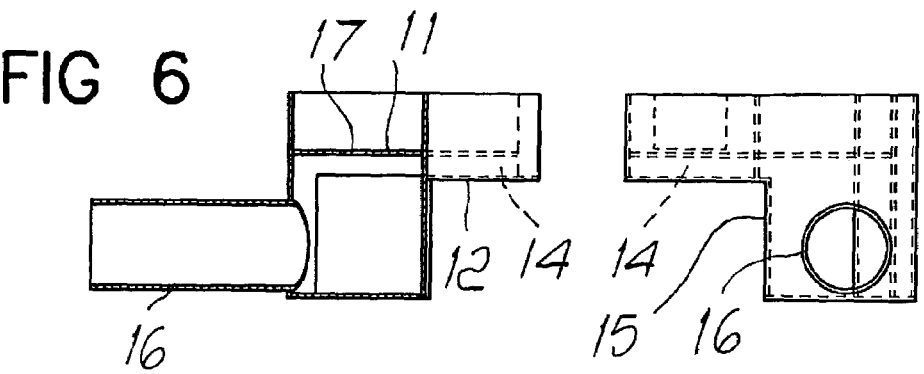
FIG 6
FIG 7
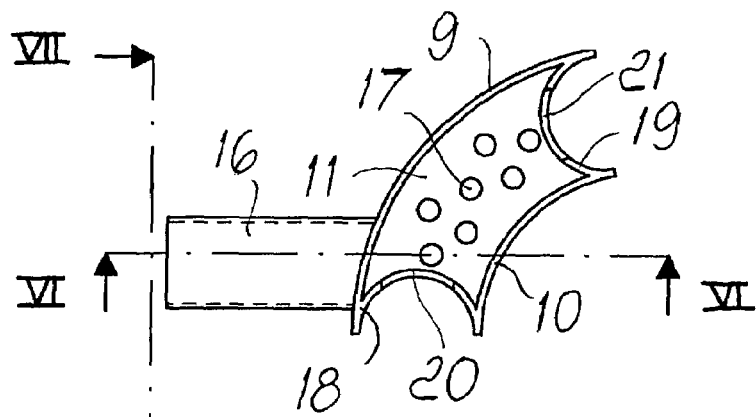
FIG 4
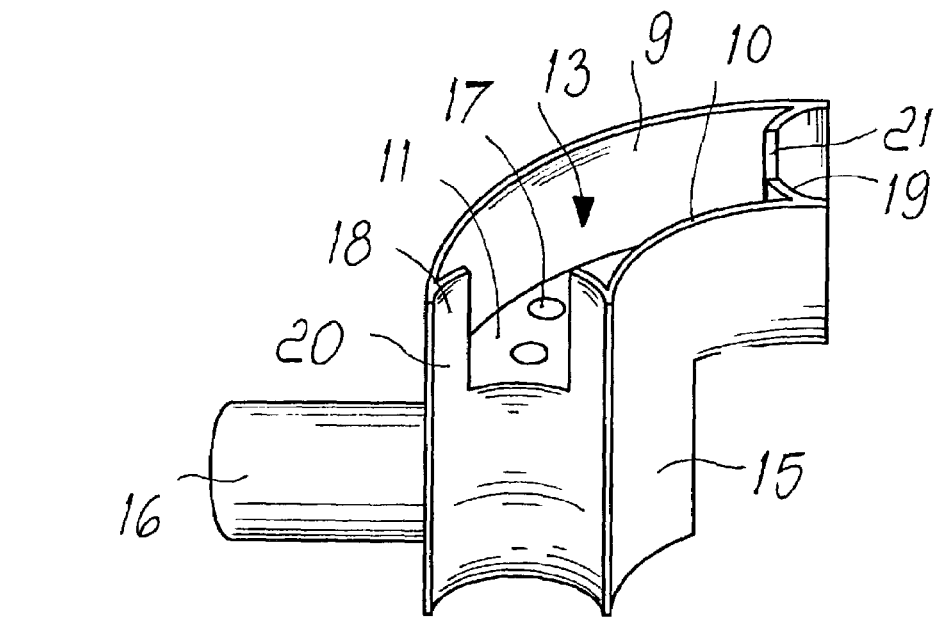
FIG 5

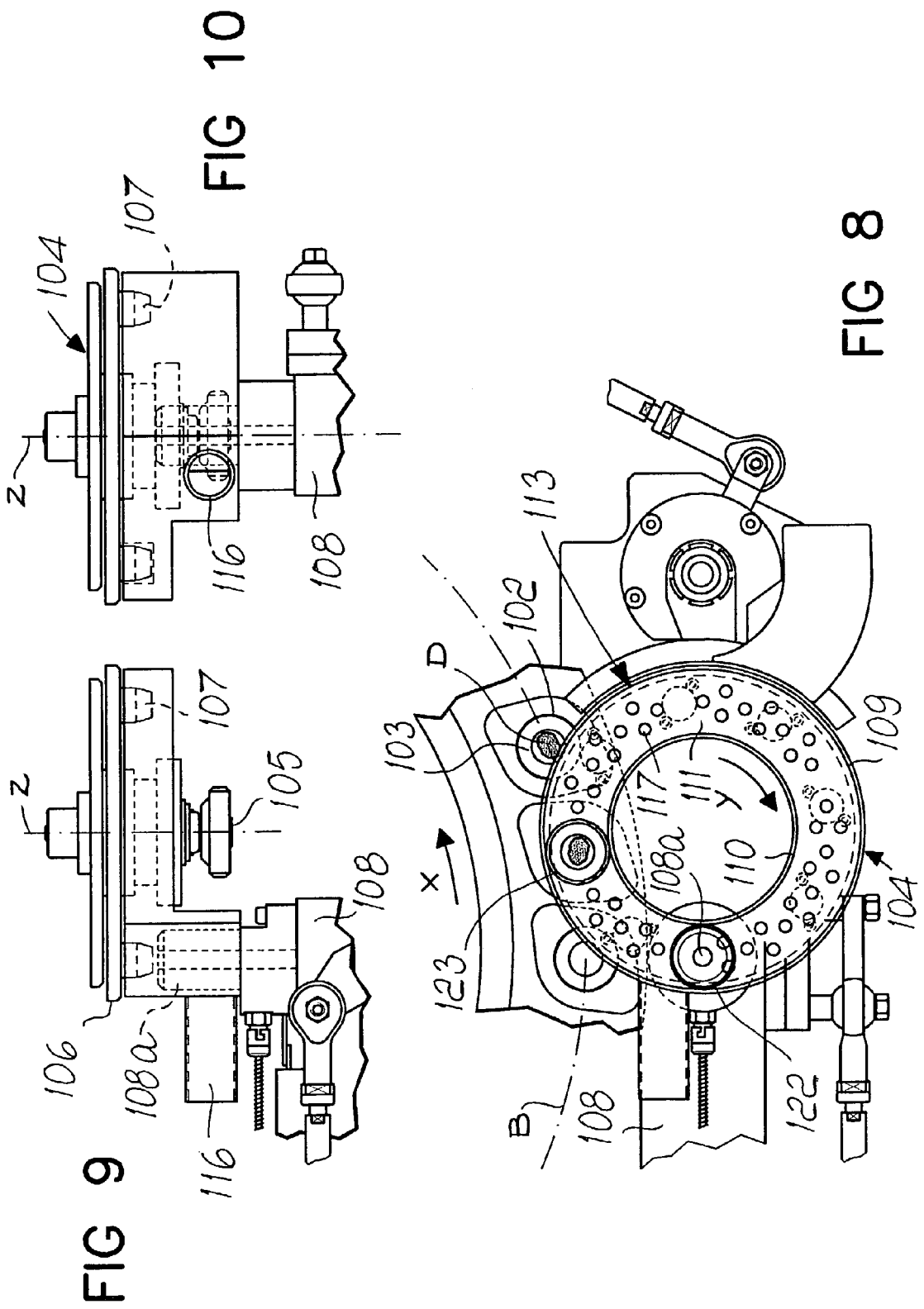

APPARATUS FOR COMPRESSION MOLDING ARTICLES MADE OF PLASTICS

BACKGROUND OF THE INVENTION

The present invention relates to an apparatus for compression molding articles made of plastics.

The invention can be applied non-exclusively to an apparatus for manufacturing any plastic articles, and in particular caps for closing containers and the like.

U.S. Pat. No. 5,807,592 by the same Assignee discloses apparatuses for pressure-molding of caps for closing containers, such as screw caps. Such apparatuses comprise a carousel that rotates about a vertical axis and on which a plurality of pressure-molding units are mounted concentrically around the rotation axis of the carousel and at identical angular distances. Each one of said units comprises an upper punch, which cooperates with a lower mold that is aligned with said punch and has a molding cavity.

By virtue of the rotation of the carousel, the molding units trace a circular path, which comprises a first sector, in which the necessary doses of plastic material to be molded are deposited in the cavities of the molds, a second sector, in which the article is molded, a third sector, in which the molded article is cooled, and a fourth sector, in which the molded article is extracted and conveyed away.

In these known apparatuses, the plastic material to be molded is removed from an extruder by means of a rotating head provided with a plurality of removal elements, which trace a circular path that has a point of tangency with the extrusion nozzle and with the circular path traced by the molding units. The rotating head and the carousel are mutually in step, in order to allow the removal elements to remove in succession doses of plastic material from the extruder and deposit them in the cavities of the molds.

Apparatuses for forming liners inside preformed caps are also known. In these apparatuses, the doses of plastic material, after being removed, are introduced in the preformed caps conveyed by a rotating head. The caps are then transferred into the molding units of a rotating carousel, which form the liners directly inside the caps.

The conventional apparatuses suffer the drawback that the doses of plastic material removed from the extruder, by moving in a free air environment, do not maintain a constant temperature until molding occurs and therefore have differences in the degree of plasticity of the plastic material between the surface layers and the innermost layers.

These differences cause variations in the flow of the plastic material during molding and generate defects on the finished product.

This drawback, moreover, is worsened by the removal elements, which cool down along the path that they trace, so that when they make contact with the plastic material at the outlet of the extruder they cause a localized temperature variation in the contact region, which causes aesthetic surface defects on the product.

SUMMARY OF THE INVENTION

The aim of the present invention is therefore to provide an improved apparatus so as to obviate the drawbacks on the finished product.

This aim is achieved with an apparatus whose characteristics are defined in the appended claims.

BRIEF DESCRIPTION OF THE DRAWINGS

Further features and advantages of the invention will become better apparent from the description of two embodiments thereof, illustrated hereinafter by way of non-limitative example with the accompanying drawings, wherein:

FIG. 4 is a plan view of a detail of the apparatus;

FIG. 5 is a perspective view of the detail of FIG. 5;

FIG. 6 is a sectional view, taken along the line VI—VI of FIG. 4;

FIG. 7 is a sectional view, taken along the line VII—VII of FIG. 4;

FIG. 8 is a partial plan view of a second embodiment of the invention;

FIG. 9 is an elevation view of the embodiment of FIG. 8;

FIG. 10 is an elevation view of the embodiment of FIG. 8, rotated through 90° with respect to the embodiment of FIG. 9;

DESCRIPTION OF THE PREFERRED EMBODIMENTS

Figure 3:
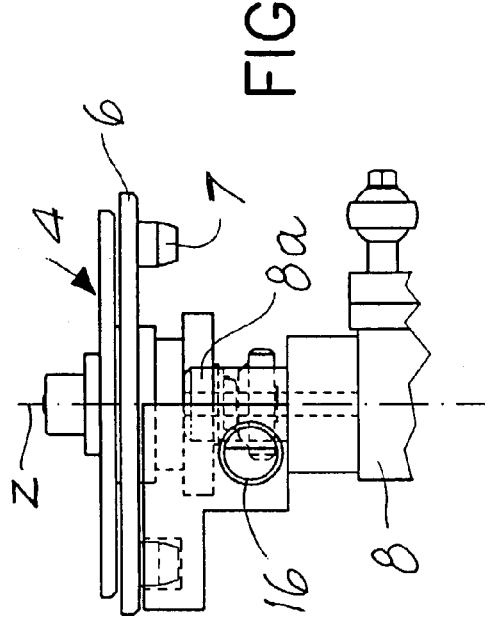
FIG. 3 is an elevation view, rotated through 90° with respect to the view of FIG. 2.

With reference to FIGS. 1 to 7, reference numeral 1 designates a portion of the carousel of an apparatus for compression molding, which is rotationally actuated in the direction X about a vertical axis.

The carousel 1 comprises a plurality of molding units, each whereof is composed of an upper punch (not shown in the drawing), which is aligned with a lower mold 2.

Each mold 2 has a cavity 3, which is open upward and in which a dose D of plastic material is molded; said dose is introduced therein in the pasty state and is fed by a rotating head 4, which rotates in the direction Y about a further vertical axis Z that is parallel to the rotation axis of the carousel.

The mold 2 is mounted at the top of a vertical stem, which is guided in a seat of the carousel 1 and is actuated by a hydraulic jack (not shown), which can be connected, by way of suitable valve systems, to a supply of pressurized fluid. When the pressurized fluid pushes the stem upward, the mold 2, in an appropriate region of the path traced by the carousel, compresses the dose D of plastic material against the punch, performing, along a subsequent arc of the path, the molding of the article, for example a cap-type closure.

Said rotating head 4 is shown only schematically in the accompanying drawings, since it is not relevant to the inventive concept of the present invention. In any case, it can be understood more clearly from the aforesaid U.S. Pat. No. 5,807,592.

Figure 2:
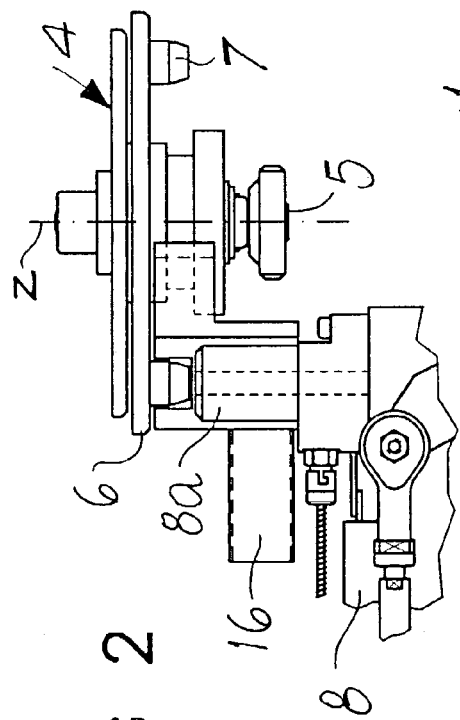
FIG. 2 is an elevation view of the embodiment of FIG. 1.
Figure 1:
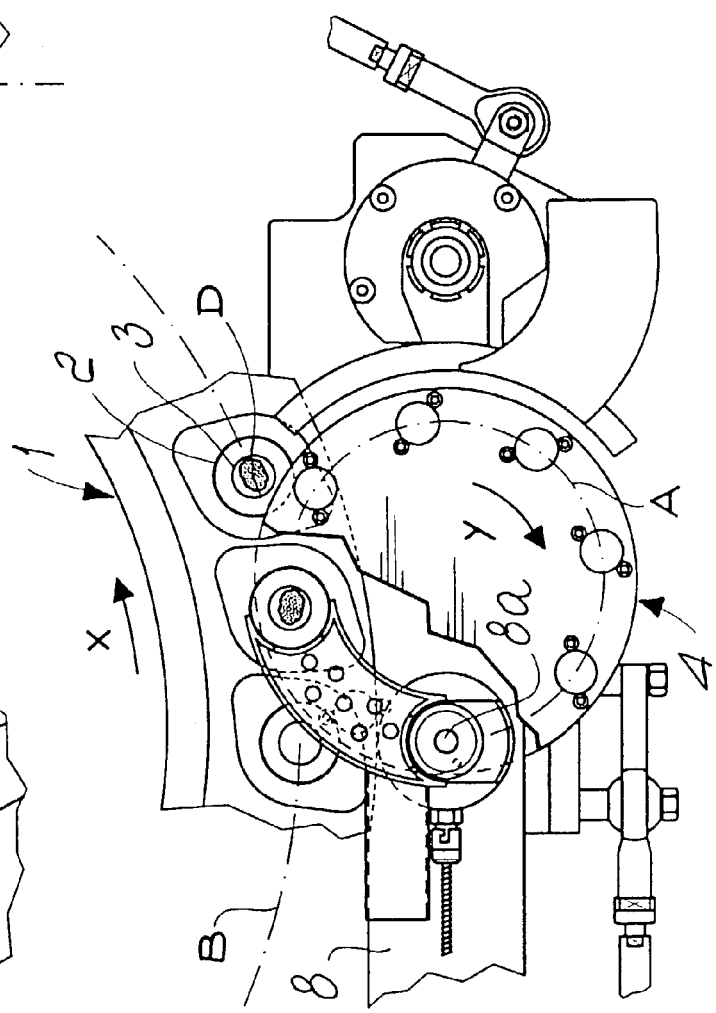
FIG. 1 is a partial plan view of a first embodiment of the invention.

As shown in FIGS. 2 and 3, the rotating head 4 comprises a shaft 5, which rotates about the vertical axis Z and to the top of which a flange 6 is rigidly coupled; a plurality of elements 7 for removing the doses of plastic material are fixed to the lower face of said flange and are distributed around the axis Z at an equal circumferential distance that is equal to the one by which the molds 2 are spaced around the axis of the carousel A. Each removal element 7 comprises a sort of cup, which has a concave portion directed along the rotation axis Y. The lower edge of the cups 7 is co-planar to the outlet of a nozzle 8a of an extruder 8, whose opening is directed upward so that during the rotation of the head 4 each cup 7 can remove from the nozzle a dose D of plastic material that corresponds to the dose that exits from the nozzle in the time that elapses between the passage of two successive cups in front of said nozzle.

The cups 7 trace a path A that is tangent to the path B traced by the molds 2, and the angular velocities of the carousel 1 and of the rotating-head 4 are linked so that at the point of tangency of the paths A and B each cup 7 is substantially aligned with a respective mold 2. The transfer of the dose D from the cups 7 into the cavities 3 of the molds can be performed as described in the aforesaid U.S. Pat. No. 5,807,592 by virtue of the action of a jet of compressed air that is directed downward, possibly combined with a downward mechanical action obtained by providing, in each cup, an expulsion piston that can move vertically and is actuated by compressed air by way of valve means.

As explained initially, with known compression molding carousels of the type described above, the dose D of plastic material, after being removed by the cups 7, is struck by the stream of air for a certain time before it is deposited in the cavities 3. During this time, the dose D undergoes a cooling that alters its consistency, so that during molding there is an uneven flow of the plastic material, with the mentioned defects that can be observed on the finished article. This drawback is combined with the fact that the removed doses transfer heat to the cups, which dissipate it during the rotation of the carousel, so that at every removal of the doses from the extruder, the temperature decrease due to the contact of the doses with the cups is added to the temperature decrease of the doses caused by the air of the environment.

In order to obviate this drawback, a stationary device is associated with the outlet of the extruder 8 and keeps the temperature of the doses substantially constant.

Said device (see FIGS. 4 to 7) is composed of two vertical walls 9 and 10, which are shaped like a circular arc and lie concentrically to the rotation axis of the carousel 4, between the extruder 8 and the point of tangency of the paths A and B.

Two superimposed horizontal walls or bottoms 11 and 12 are arranged between the walls 9 and 10; the upper bottom 11 forms, together with the walls 9 and 10, an upper channel 13, while the lower bottom 12 encloses, together with the bottom 11, a duct 14 that is connected to a compartment 15.

The compartment 15 is connected, by means of a tube 16, to a delivery of heated air, which after being conveyed through the compartment 15 into the duct 14 flows into the upper channel 13 through a plurality of openings 17 formed in the upper bottom 11.

The device is adjacent to the flange 6, so that the edges of the walls 9 and 10 skim the lower face of the flange 6, so as to close in practice the channel 13.

In order to reduce the escape of the hot air from the channel 13, at the opposite end of said channel there are two respective transverse partitions 18 and 19, in which two passage openings 20 and 21 are formed; said openings are sized so as to allow the passage of the cups 7 during the rotation of the head 4.

Operation of the device according to the invention is readily understandable from the above description. In particular, it should be noted that the doses D removed from the outlet of the extruder 8, by passing through a channel that is substantially closed until they are deposited in the cavities 3, do not undergo appreciable temperature variations. Indeed, by adjusting appropriately the temperature of the air fed into the channel it is possible to adjust the temperature of the doses to values for optimizing the consistency of the plastic material during molding, so as to ensure the production of articles that are free from structural and aesthetic defects.

The described device is susceptible of numerous modifications and variations, all of which are within the scope of the same inventive concept and are shown in FIGS. 8 to 14. It is noted that for the sake of simplicity in description, the parts that are identical, similar or equivalent to the parts of the apparatus shown in FIGS. 1 to 10 are designated by the same reference numerals increased by 100 for the variation of FIGS. 8 to 10, by 200 for the variation of FIGS. 11 and 12, and by 300 for the variation of FIGS. 13 and 14.

FIGS. 8, 9 and 10 illustrate a solution in which the walls 109, 110 close concentrically in a cylindrical shape around the rotation axis Z of the rotating head, so as to form a circular channel 113, which remains closed by the flange 106 and in which the cups 107 rotate. The openings 117 are formed in the circular bottom 111 and allow connection to the underlying duct 114 (not shown) and therefore the feeding of the hot air, which by filling all of the circular channel 113 keeps its temperature at a substantially constant value, which can in any case be preset according to the requirements.

A first access opening 122 and a second access opening 123 are formed through the upper bottom 111 and the lower bottom 112 (not shown); said first opening is provided in order to allow the nozzle 108a of the extruder 108 to access the channel 113 up to the level where the doses D are removed by the cups 107, and the removed doses are deposited through said second opening into the cavities of the molds 103.

The solution of FIGS. 8 to 10, with respect to the one described above, offers the advantage of keeping the temperature of the cups 107 substantially constant, so as to prevent the cups from cooling during the rotation of the head 104 and, by making contact with the doses, from causing damaging variations in the consistency of the plastic material and from forming defects that can be observed on the outer surface of the molded article.

Figure 12:
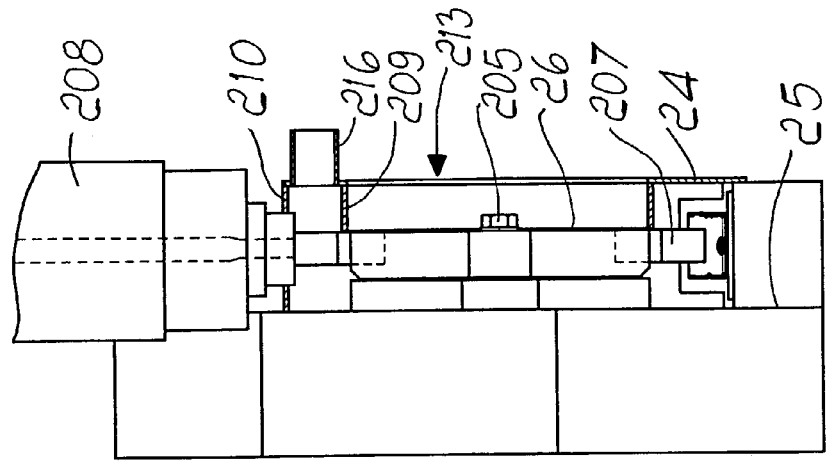
FIG. 12 is a sectional view, taken along the line XII—XII of FIG. 11.
Figure 11:
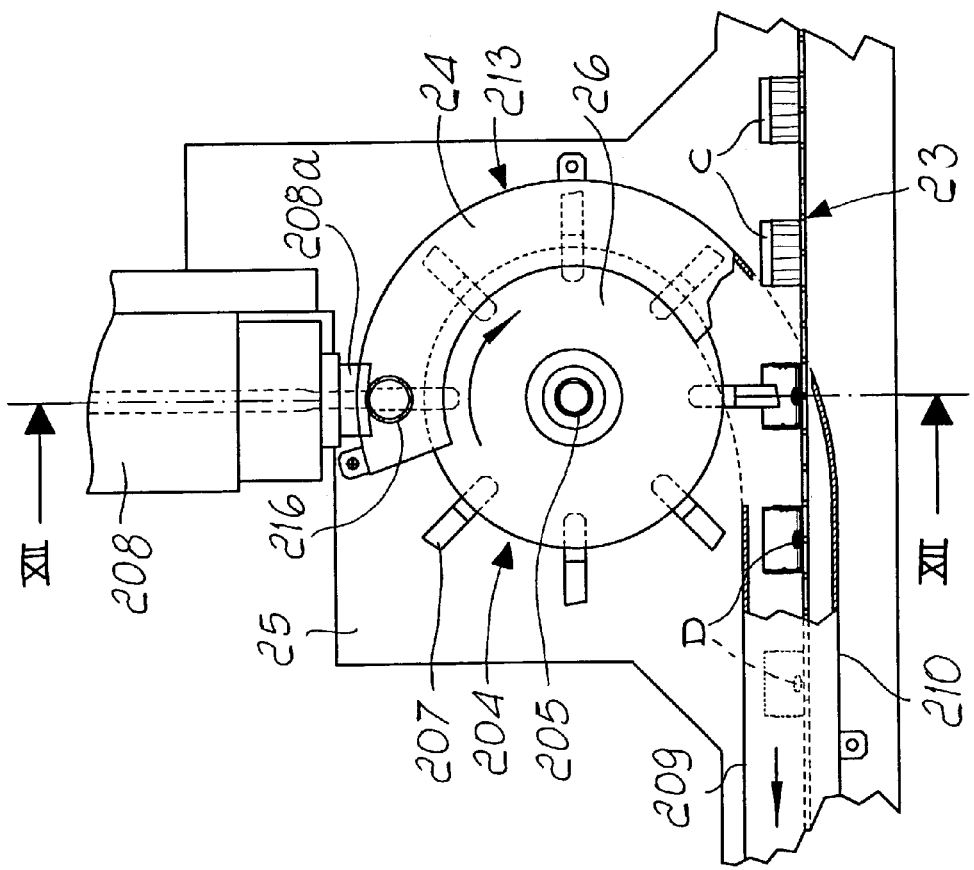
FIG. 11 is an elevation view of a third embodiment of the invention.
Figures 13, 14:
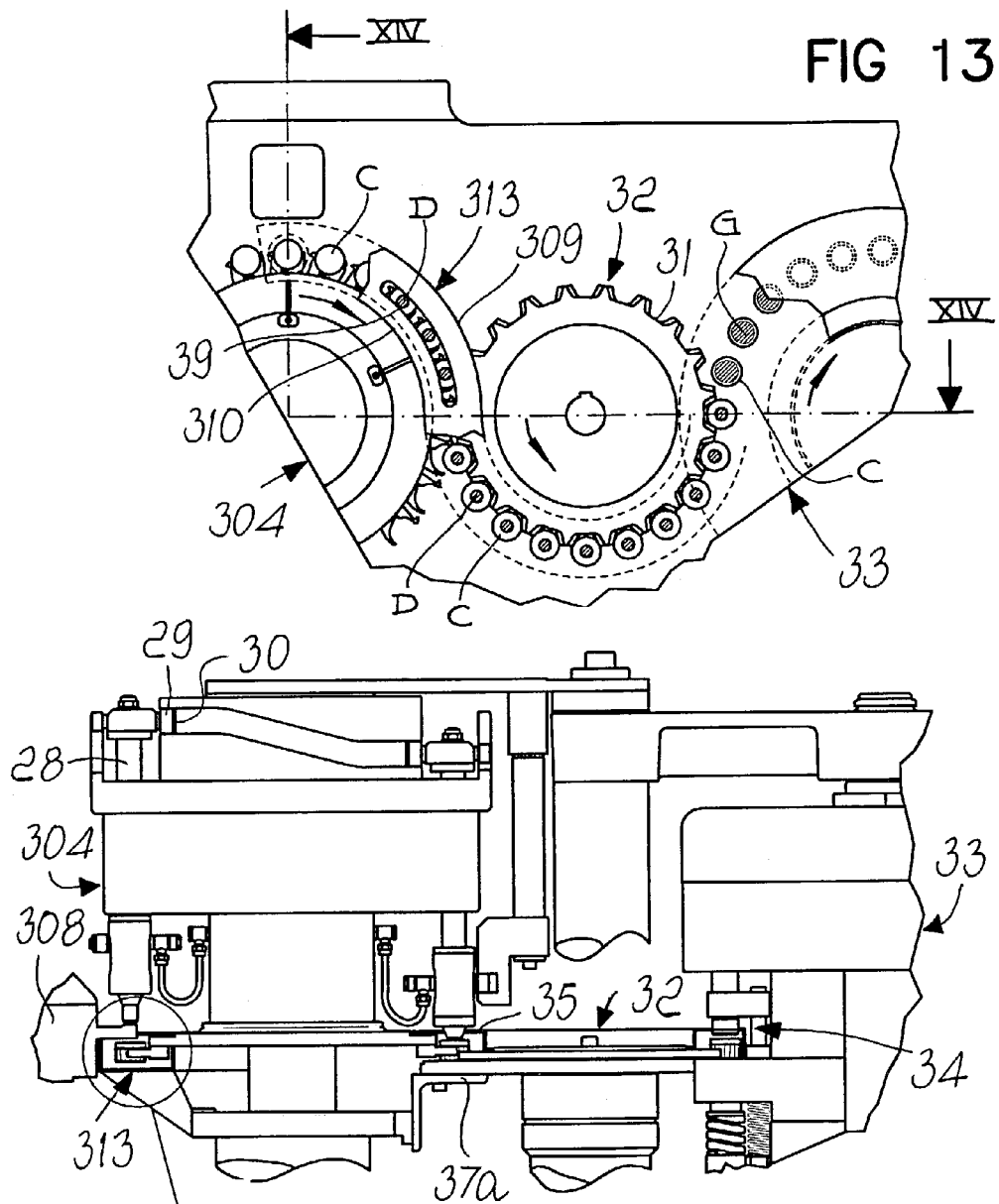
FIG. 13 is a plan view of a fourth embodiment of the invention; and finally
FIG. 14 is an elevation view, taken along the line XIV—XIV of FIG. 13, and an enlarged-scale view of a detail.

The two variations shown in FIGS. 11 and 12 and respectively in FIGS. 13 and 14 relate to adaptations of the inventive concept to an apparatus for forming a liner inside caps C.

The variation of FIGS. 11 and 12 comprises a vertical extruder 208 with a nozzle 208a that is orientated downward. Below the extruder 208 there is the rotating head 204, which is keyed on a shaft 205 that has a horizontal axis and is provided with cups 207 that are arranged radially with respect to the shaft 205.

A conveyor 23 is arranged tangentially below the rotating head 204 and conveys the caps C at a mutual distance equal to the circumferential distance of the cups 207.

The rotating head 204 is synchronized with the conveyor so that each cup 207 deposits the dose D removed from the nozzle 208a in a respective cap C.

The cups 207, along the semicircular portion of the path that runs from the nozzle 208a to the point of tangency with the conveyor, rotate inside a semicircular channel 213 formed between two walls 209 and 210 that lie concentrically to the shaft 205 and continue parallel to the conveyor 23 above and below the caps C.

The channel 213 is closed at the front by a wall 24, which joins the walls 209 and 210 and at the rear by a side wall 25, to which the outer wall 210 is coupled, and by a disk 26, which the inner wall 209 skims with its edge.

The concentric walls 209 and 210 are provided with openings that allow the cups 207 to enter and exit the channel.

At the nozzle 208a there is the connecting tube 216 for connection to the delivery of hot air, which accordingly conditions the temperature of the doses from the point where they are removed to the point where they are compressed inside the caps C in order to produce the liners.

The embodiment of FIGS. 13 and 14 also comprises a rotating head 304, which has a vertical axis and concentrically to which a plurality of grip elements 27 are provided, that are similar to clamps and are actuated like clamps in order to grip and retain the caps C. A rotating head of this type is described for example in greater detail in U.S. Pat. No. 4,518,336 by the same Assignee, to which reference is made here as an integral part of the present description.

A cup 307 is provided in alignment with each individual grip element 27 and above the respective cap C, and is rigidly coupled to a stem 28 that can slide vertically and is provided, at the top, with a roller 29 that follows a stationary cam 30. The cam 30 actuates the stems 28 between a position for removing the doses D from an extruder 308 and a position for depositing said doses inside the caps C.

The caps C, with the dose D deposited therein, after covering a preset rotation angle (approximately 90° in FIG. 14), are inserted in respective seats 31 of a rotary star conveyor 32, by which they are transferred onto a molding carousel 33 equipped with molding units 34, which mold the liners G inside the caps C.

The caps C move from the extruder 308 to the carousel 33 inside a channel 313 that is S-shaped and runs, along a first part of its length, concentrically to the rotation axis of the rotating head 304 and, along a second part, concentrically to the rotation axis of the star conveyor 32.

The channel 313 has, along said first part, a substantially tubular structure with a rectangular cross-section, which is formed by two vertical walls 309 and 310 and two upper and lower horizontal walls 35 and 36. The lower wall, along the arc that is concentric to the axis of the star conveyor 32, is integrated, along half of its radial width, by the peripheral annular region of the star conveyor 32.

The channel 313 is supported by brackets 37, 37a, which are fixed to fixed parts 38 of the apparatus, and is connected to a hot air supply as in the previously described examples. In order to allow the doses D to be deposited in the caps C after being removed from the extruder 308 by means of the cups 307, along the portion of the upper wall that is concentric to the axis of the rotating head 304 there is an arc-like slot 39, through which the cups 307 can be arranged adjacent to the caps in order to deposit the doses and can be raised back into the position in which they are ready for the subsequent removal.

As clearly shown, the embodiment of FIGS. 13 and 14, like the embodiment of FIGS. 11 and 12, illustrates the possibility to condition the temperature of the doses even when the path between the removal point and the deposition point of the doses is considerably long.

In the practical execution of the invention, the thermal conditioning of the doses can be provided not only by means of hot air but also by subjecting the doses to heating by irradiation or by heating the air in the channel with electrical means. Moreover, it has been found that even without adding heat from outside the system is capable of ensuring a thermal equilibrium by utilizing the heat of the nozzle of the extruder and of the extruded plastic material.

The disclosures in Italian Patent Application No. BO2002A000225 from which this application claims priority are incorporated herein by reference.

What is claimed is:

1. Apparatus for compression molding of articles made of plastics, comprising:
   molding means comprising a punch-and-cavity arrangement for compression molding a dose of plastics;
   feeding means for feeding individual doses of plastics, said feeding means comprising a plurality of removal elements, each removal element being such as to sever a corresponding dose from an extruder outlet and transfer the dose to a delivery position interposed between a punch and a cavity of said molding means;
   and conditioning means extending from said extruder outlet to said delivery position for conditioning temperature of said doses during transfer thereof from said extruder outlet to said molding means.

2. Apparatus according to claim 1, wherein said conditioning means comprises a conditioning channel that runs from said extruder outlet to said molding means, said removal elements being movable inside said conditioning channel.

3. Apparatus according to claim 2, wherein said molding means comprises a carousel rotatable about a vertical axis and a plurality of molding units mounted on said carousel concentrically to said vertical axis at identical angular distances from each other, each molding unit comprising an upper punch and a lower mold provided with a cavity for molding said articles, said upper punch and said lower mold being aligned with each other along respective vertical axes between a spaced position and a closer position; actuation means for actuating said carousel so that said molding units advance by following a circular path along which said feeding means are provided, said feeding means comprising a rotatable head provided with a flange that is rotatable about a further vertical axis, said removal elements being rigidly coupled below said flange for removing in succession individual doses from said extruder outlet, each one of said removal elements being arranged so as to deposit the removed dose in the cavity of a respective lower mold when said lower mold is spaced from the respective upper punch; said conditioning channel being concentric to said further vertical axis and running at least from the extruder outlet to a point of tangency between an upper path of said removal elements and a path traced by the molds, and being closed in an upward region by said flange.

4. Apparatus according to claim 3, wherein said conditioning channel is delimited by two vertical walls that are concentric to said further vertical axis, an upper bottom and a lower bottom being arranged between said two vertical walls and forming a duct that is connected to a source for feeding hot air, a plurality of openings for conveying said hot air into said conditioning channel being further provided in said upper bottom, upper edges of said conditioning channel being in sliding contact with a lower face of said flange.

5. Apparatus according to claim 4, wherein said conditioning channel has an inlet for entry of said removal elements and an outlet for exit of said removal elements, said inlet and said outlet being formed in respective partitions that lie transversely to said conditioning channel and connect opposite ends of said two vertical walls to said upper bottom and to said lower bottom.

6. Apparatus according to claim 4, wherein said two vertical walls are arranged closed in a cylindrical shape, concentrically to said further vertical axis, so as to form a circular conditioning channel having an upper bottom and a lower bottom which are annular and form therebetween said duct connected to said source of hot air, two access openings being formed through said bottoms to allow access to said conditioning channel of said extruder outlet and deposition of each dose in the cavity of said lower mold.

7. Apparatus according to claim 3, wherein said conditioning means is so configured as to use heat from said extruder outlet and said doses.

8. Apparatus for compression molding of articles made of plastics, comprising:
  molding means for compression molding doses of plastics;
  feeding means for feeding said doses, said feeding means comprising a plurality of removal elements supported by a rotatable head, each removal element being such as to remove a dose from an extruder outlet and carry the dose towards said molding means while said rotatable head is rotated;
  and conditioning means for conditioning temperature of each dose while said dose is held by a corresponding removal element.

9. Apparatus according to claim 8, wherein said conditioning means comprises a conditioning channel that runs from said extruder outlet to said molding means, said removal elements being movable inside said conditioning channel.

10. Apparatus according to claim 9, wherein said molding means comprises a carousel rotatable about a vertical axis and a plurality of molding units mounted on said carousel concentrically to said vertical axis at identical angular distances from each other, each molding unit comprising an upper punch and a lower mold provided with a cavity for molding said articles, said upper punch and said lower mold being aligned with each other along respective vertical axes between a spaced position and a closer position; actuation means for actuating said carousel so that said molding units advance by following a circular path along which said feeding means are provided; said rotatable head having a flange that is rotatable about a further vertical axis, said removal elements being rigidly coupled below said flange for removing in succession individual doses from said extruder outlet, each one of said removal elements being arranged so as to deposit the removed dose in the cavity of a respective lower mold when said lower mold is spaced from the respective upper punch; said conditioning channel being concentric to said further vertical axis and running at least from the extruder outlet to a point of tangency between an upper path of said removal elements and a path traced by the molds, and being closed in an upward region by said flange.

11. Apparatus according to claim 10, wherein said conditioning channel is delimited by two vertical walls that are concentric to said further vertical axis, an upper bottom and a lower bottom being arranged between said two vertical walls and forming a duct that is connected to a source for feeding hot air, a plurality of openings for conveying said hot air into said conditioning channel being further provided in said upper bottom, upper edges of said conditioning channel being in sliding contact with a lower face of said flange.

12. Apparatus according to claim 11, wherein said conditioning channel has an inlet for entry of said removal elements and an outlet for exit of said removal elements, said inlet and said outlet being formed in respective partitions that lie transversely to said conditioning channel and connect opposite ends of said two vertical walls to said upper bottom and to said lower bottom.

13. Apparatus according to claim 11, wherein said two vertical walls are arranged closed in a cylindrical shape, concentrically to said further vertical axis, so as to form a circular conditioning channel having an upper bottom and a lower bottom which are annular and form therebetween said duct connected to said source of hot air, two access openings being formed through said bottoms to allow access to said conditioning channel of said extruder outlet and deposition of each dose in the cavity of said lower mold.

14. Apparatus according to claim 9, wherein said rotatable head is rotatable about a horizontal axis; said apparatus further comprising a conveyor for caps, which is arranged tangentially below said rotatable head for conveying caps with respective doses deposited therein by said removal elements to said molding means; said conditioning channel being connected to a supply of thermally conditioned air and being composed of a first semicircular portion, in which said removal elements move from said extruder outlet to said point of tangency, and a second straight portion, in which said caps that contain said doses advance, said conditioning channel being formed by walls provided with openings that allow passage of said removal elements.

15. Apparatus according to claim 9, wherein said rotatable head is rotatable about a vertical axis and is provided with grip elements for retaining caps, each one of said grip elements being aligned with a respective removal element; the apparatus further comprising a star conveyor for transferring said caps from said grip elements to a molding carousel of said molding means, after the removal elements have deposited respective doses in said caps; said conditioning channel being connected to a supply of thermally conditioned air and running partially around said head and partially around said star conveyor along a feeding path on which said caps advance after deposition of said doses therein.

16. Apparatus according to claim 9, wherein said conditioning means is so configured as to use heat from said extruder outlet and said doses.

17. Apparatus for compression molding of articles made of plastics, comprising:
  molding means;
  feeding means for feeding doses of plastic material, said feeding means comprising a rotatable head having a disc supporting a plurality of removal elements, each removal element being such as to remove a dose from an extruder and transfer the dose to said molding means;
  and conditioning means for conditioning temperature of said doses during transfer thereof from said extruder to said molding means, wherein said conditioning means comprises a conditioning channel through which said removal elements are movable, said conditioning channel being partially bounded by a surface of said disc.

18. Apparatus according to claim 17, wherein said molding means comprises a carousel rotatable about a vertical axis and a plurality of molding units mounted on said carousel concentrically to said vertical axis at identical angular distances from each other, each molding unit comprising an upper punch and a lower mold provided with a cavity for molding said articles, said upper punch and said lower mold being aligned with each other along respective vertical axes between a spaced position and a closer position; actuation means for actuating said carousel so that said molding units advance by following a circular path along which said feeding means are provided, said disc being rotatable about a further vertical axis, each one of said removal elements being arranged so as to deposit the removed dose in the cavity of a respective lower mold when said lower mold is spaced from the respective upper punch; said conditioning channel being concentric to said further vertical axis and running at least from the extruder outlet to a point of tangency between an upper path of said removal elements and a path traced by the molds, and being closed in an upward region by said disc.

19. Apparatus according to claim 18, wherein said conditioning channel is delimited by two vertical walls that are concentric to said further vertical axis, an upper bottom and a lower bottom being arranged between said two vertical walls and forming a duct that is connected to a source for feeding hot air, a plurality of openings for conveying said hot air into said conditioning channel being further provided in said upper bottom, upper edges of said conditioning channel being in sliding contact with a lower face of said flange.

20. Apparatus according to claim 19, wherein said conditioning channel has an inlet for entry of said removal elements and an outlet for exit of said removal elements, said inlet and said outlet being formed in respective partitions that lie transversely to said conditioning channel and connect opposite ends of said two vertical walls to said upper bottom and to said lower bottom.

21. Apparatus according to claim 19, wherein said two vertical walls are arranged closed in a cylindrical shape, concentrically to said further vertical axis, so as to form a circular conditioning channel having an upper bottom and a lower bottom which are annular and form therebetween said duct connected to said source of hot air, two access openings being formed through said bottoms to allow access to said conditioning channel of said extruder outlet and deposition of each dose in the cavity of said lower mold.

22. Apparatus according to claim 18, wherein said rotatable head is rotatable about a horizontal axis; said apparatus further comprising a conveyor for caps, which is arranged tangentially below said rotatable head for conveying caps with respective doses deposited therein by said removal elements to said molding means; said conditioning channel being connected to a supply of thermally conditioned air and being composed of a first semicircular portion, in which said removal elements move from said extruder to said point of tangency, and a second straight portion, in which said caps that contain said doses advance, said conditioning channel being formed by walls provided with openings that allow passage of said removal elements.

23. Apparatus according to claim 18, wherein said conditioning means is so configured as to use heat from said extruder outlet and said doses.

* * * * *